United States Patent
Kim et al.

(10) Patent No.: US 10,292,038 B2
(45) Date of Patent: May 14, 2019

(54) METHOD FOR ACQUIRING BUSINESS OPERATOR NETWORK IDENTIFICATION NUMBER OF VISITED NETWORK

(71) Applicant: LG ELECTRONICS INC., Seoul (KR)

(72) Inventors: Hyunsook Kim, Seoul (KR); Jinsook Ryu, Seoul (KR); Laeyoung Kim, Seoul (KR); Myungjune Youn, Seoul (KR); Dongsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/768,723

(22) PCT Filed: Sep. 21, 2016

(86) PCT No.: PCT/KR2016/010516
§ 371 (c)(1),
(2) Date: Apr. 16, 2018

(87) PCT Pub. No.: WO2017/082532
PCT Pub. Date: May 18, 2017

(65) Prior Publication Data
US 2018/0310162 A1  Oct. 25, 2018

Related U.S. Application Data

(60) Provisional application No. 62/252,594, filed on Nov. 9, 2015.

(51) Int. Cl.
*H04W 8/04* (2009.01)
*H04W 8/06* (2009.01)
(Continued)

(52) U.S. Cl.
CPC ............... *H04W 8/04* (2013.01); *H04W 8/06* (2013.01); *H04W 8/12* (2013.01); *H04W 12/06* (2013.01);
(Continued)

(58) Field of Classification Search
CPC ....... H04W 8/04; H04W 88/16; H04W 12/06; H04W 36/0022; H04W 8/12; H04W 8/06; H04W 60/00
See application file for complete search history.

(56) References Cited

U.S. PATENT DOCUMENTS

2012/0127926 A1   5/2012   Drevon et al.

FOREIGN PATENT DOCUMENTS

| KR | 10-0842633 B1 | 6/2008 |
| WO | WO 2015/028083 A1 | 3/2015 |

OTHER PUBLICATIONS

LG Electronics et al., "Alternative Solution for Key Issue #3", S2-153276, 3GPP TSG-SA WG2 Meeting #111, Chengdu, P.R. China, Oct. 19-23, 2015, 3 pages.
(Continued)

*Primary Examiner* — Nam T Huynh
(74) *Attorney, Agent, or Firm* — Birch, Stewart, Kolasch & Birch, LLP

(57) ABSTRACT

An embodiment of the present specification provides a method for acquiring an identifier of a visited public land mobile network (V-PLMN), in which a user equipment is roaming, by a proxy-call session control function (P-CSCF) of a home public land mobile network (H-PLMN). The method may comprise the steps of: receiving a register message from the user equipment; generating a first V-PLMN identifier on the basis of the register message; and transferring the first V-PLMN identifier to a home subscriber server (HSS), wherein whether the first V-PLMN identifier
(Continued)

corresponds to an identifier of the V-PLMN which is serving the user equipment is verified by the HSS through comparison with a second V-PLMN identifier acquired in an initial attach procedure for an evolved packet core (EPC) of the user equipment.

8 Claims, 15 Drawing Sheets

(51) Int. Cl.
    *H04W 8/12*     (2009.01)
    *H04W 12/06*     (2009.01)
    *H04W 36/00*     (2009.01)
    *H04W 60/00*     (2009.01)
    *H04W 88/16*     (2009.01)

(52) U.S. Cl.
    CPC ....... *H04W 36/0022* (2013.01); *H04W 60/00* (2013.01); *H04W 88/16* (2013.01)

(56) References Cited

OTHER PUBLICATIONS

Zte, "Solution for Key Issue#3—Providing VPLMN ID", S2-153349, 3GPP TSG-SA WG2 Meeting #111, Chengdu, P.R. China, Oct. 19-23, 2015, 3 pages.

METHOD FOR ACQUIRING BUSINESS OPERATOR NETWORK IDENTIFICATION NUMBER OF VISITED NETWORK

CROSS REFERENCE TO RELATED APPLICATIONS

This application is the National Phase of PCT International Application No. PCT/KR2016/010516, filed on Sep. 21, 2016, which claims priority under 35 U.S.C. 119(e) to U.S. Provisional Application No. 62/252,594, filed on Nov. 9, 2015, all of which are hereby expressly incorporated by reference into the present application.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23,402, A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
|---|---|
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |
| Rx | A reference point between PCRF and AF (Application Function), AF can be P-CSCF of IMS network |

Among the reference points shown in FIG. 1, S2a and S2b correspond to a Non-3GPP interface. S2a is a reference point that provides the user plane with the relevant control and mobility support between trusted Non-3GPP access and PDN GW. S2b is a reference point providing the user plane with the associated control and mobility support between the ePDG and the PDN GW.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 illustrates a connection process in a radio resource control (RRC) layer.

FIG. 5 shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

FIG. 6 shows a connection between an EPC and an IP multimedia subsystem (IMS).

Referring to FIG. 6, the EPC includes an MME 51, an S-GW 52, a P-GW 53a to be coupled to the IMS, a P-GW 53b to be coupled to the Internet, and a policy and charging rule function (PCRF) 58 to be coupled to the P-GW 53a.

A network technology which enables up to a wireless terminal to perform packet switching (PS) based on an Internet protocol (IP) is proposed to connect both wired/wireless terminals through all-IPs.

A network based on the IMS includes a call session control function (CSCF) for control signaling, registration, and cession processing and a session and interconnection border control function (IBCF) 62. The CSCF may include a proxy-CSCF (P-CSCF) 61 and an S-CSCF (Serving-CSCF) 63. In addition, the CSCF may include an interrogating-CSCF (I-CSCF). The P-CSCF 61 acts as a first access point for a user equipment (UE) in the IMS-based network. In addition, the S-CSCF 63 processes a session in the IMS network. That is, the S-SCSF 63 is an entity which is in charge of routing signaling, and routes the session in the IMS network. In addition, the I-CSCF acts as an access point with respect to another entity within the IMS network.

An IP-based session is controlled by a session initiation protocol (SIP) under the IMS. The SIP is a protocol for controlling the session. The SIP is a signaling protocol which specifies a procedure for finding locations by identifying UEs to be communicated, generating a multimedia service session between the UEs, and deleting and changing the generated session. The SIP uses an SIP uniform resource identifier (URI) similar to an e-mail address to distinguish each user, so that a service can be provided without being dependent on an Internet protocol (IP) address. The SIP message is a control message, but is transmitted between the UE and the IMS network through an EPC user plane.

Referring to FIG. 6, the first P-GW 53a of the EPC is coupled to the P-CSCF 61 of the IMS, the P-CSCF 61 is coupled to the IBCF 62, and the IBCF 62 is coupled to the S-CSCF 63.

In addition, the second P-GW 53b of the EPC is coupled to a network of the Internet service operator.

Hereinafter, an initial access procedure of the UE 10 is described.

According to the initial access procedure, the EPC may allocate a default bearer to the UE 10, and may register the UE 10. In addition, the UE 10 may be allocated an IP address to use an IMS network from the PGW 53, and may obtain an address of the P-CSCF 61 to register to an IMS network.

FIG. 7 is an exemplary signal flow diagram showing an initial access procedure of a UE.

Referring to FIG. 7, for an initial access, the UE 10 which has been powered on configures an RRC connection with the eNodeB 20 as described with reference to FIG. 5 (S101).

After the RRC connection with the eNodeB 20 is established, the UE 10 transmits an attach request message to the MME 51 (S103). A PDN connectivity request message may be included in the attach request message. In this case, the UE 10 may request for an address of the P-CSCF 61 by using a protocol configuration option (PCO) field.

The MME 51 performs an authentication and security setup procedure for the UE 10 in association with the HSS 54 (S105). In the authentication procedure, the MME 51 obtains an authentication vector for a subscriber from the HSS 54, and thereafter performs mutual authentication with respect to the UE 10 by using the authentication vector. When the authentication procedure is complete, the MME 51 establishes a security key for the message security setup between the UE 10 and the MME 51.

The MME 51 performs a location registration procedure to inform the HSS 54 that the UE 10 is located in a region managed by the MME 51, and receives a user profile (S 107). The location registration procedure may be performed by using a diameter protocol on an S6a interface. In addition, the user profile received by the MME 51 may include an access point name (APN), a P-GW identifier, a quality of service (QoS) profile, or the like.

The MME 51 selects the P-GW 53, and transmits a create session request message to the selected P-GW 53 (S109). The create session request message may include the user profile and the PCO field requesting an address of the P-CSCF 61. The create session request message transmitted by the MME 51 may be delivered to the P-GW 53 via the S-GW 52.

The P-GW 53 allocates the IP of the UE 10, and selects an address list of the P-CSCFs 61 which can be used by the UE among a plurality of P-CSCFs 61 according to the PCO field. Optionally, the P-GW 53 transmits an 'indication of IP-CAN session establishment' message to the PCRF 58 (S111). In addition, the P-GW 53 receives an 'acknowledge of IP-CON session establishment' message from the PCRF 58 (S113). The 'acknowledge of IP-CON session establishment' message may include a policy of a service to be provided to the UE 10.

The P-GW 53 transmits a create session response message to the MME 51 (S115). The create session response message may include an IP allocated to the UE 10 and the address list of the P-CSCF 61. The create session response message transmitted by the P-GW 53 may be transmitted to the MME 51 via the S-GW 52.

The MME 51 transmits an attach accept message including an initial context setup request message to the eNodeB 20. In addition, the eNodeB 20 transmits to the UE an access accept message including an RRC connection reconfiguration message and an activate default EPS bearer context request message (S117).

In step S119, the UE 10 transmits an RRC connection reconfiguration complete message to the eNodeB 20 in response to reception of the RRC connection reconfiguration message (S119). The eNodeB 20 transmits an initial context setup response message to the MME 51 in response to reception of the initial context setup request message (S121).

The MME 51 transmits a modify bearer request message to the S-GW 52 in response to reception of the initial context setup response message (S123). The bearer modify request message may include an EPS bearer identifier, an eNodeB address, a handover indication, or the like. The S-GW 52 transmits a modify bearer response message to the MME 51 in response to reception of the modify bearer response message (S 125).

Hereinafter, an IMS initial registration procedure of the UE 10 will be described.

FIG. 8 is an exemplary signal flow diagram showing an IMS initial registration procedure.

Referring to FIG. 8, the UE 10 transmits a register message requesting for a registration to the P-CSCF 61 (S 201). The UE 10 may transmit a register message by using an address of the P-CSCF 61, which is identified through the activate default EPS bearer context request message.

The P-CSCF 61 delivers the register message received from the UE 10 to the I-CSCF 64 by using an address of the I-CSCF 64, which is obtained through a domain name system (DNS) query procedure (S203).

The I-CSCF 64 transmits a user authorization request (UAR) message to the HSS 54 (S205). Since there is no S-CSCF 63 allocated to the UE 10, the HSS 54 transmits to the I-CSCF 64 a user authorization answer (UAA) message including capability information of the UE 10 (S207). The capability information is information in which capability to be provided to the UE 10 is organized with an attribute value pair (AVP).

The I-CSCF 64 selects one S-CSCF 63 on the basis of the received capability information, and transmits a register message to the selected S-CSCF 63 (S209).

The S-CSCF 63 transmits a multimedia authentication request (MAR) message to the HSS 54 to request for authentication information regarding the UE 10 (S211). Since there is no authentication information regarding the UE 10 due to the IMS initial registration, the HSS 54 transmits a multimedia authentication answer (MAA) message for informing that the authentication information is required to the S-CSCF 63 (S213).

The S-CSCF 63 transmits a 401 unauthorized message for requesting for the authentication information to the UE 10 (S215). The 401 unauthorized message may include an authentication vector received from the HSS, a symmetric key designated by the S-CSCF 63, and an authentication algorithm. The 401 unauthorized message may be delivered to the UE 10 via the I-CSCF 64 and the P-CSCF 61.

The UE 10 generates authentication data by using the received authentication vector, symmetric key, and authentication algorithm, and transmits the register message including the generated authentication data to the P-CSCF 61 (S217). The P-CSCF 61 delivers the received register message to the I-CSCF 64 (S219).

The I-CSCF 64 transmits the UAR message to the HSS 54 (S221). Since the S-CSCF 63 allocated to the UE 10 exists, the HSS 54 transmits the UAA message including the identification information of the allocated S-CSCF 63 to the I-CSCF 64 since (S223). The I-CSCF 64 transmits the register message to the S-CSCF 63 (S225).

The S-CSCF 63 authenticates the UE 10 by comparing authentication data included in the register message and authentication information transmitted by the S-CSCF 63, and transmits a server assignment request (SAR) message to the HSS (S227). The HSS 54 transmits to the S-CSCF 63 a server assignment answer (SAA) message including a service profile for the UE 10 (S229).

The S-CSCF 63 transmits to the UE 10 a 200 OK message notifying that the registration is complete, thereby completing the registration procedure (S231). The 200 OK message may be delivered to the UE 100 via the I-CSCF 64 and the P-CSCF 61.

FIG. 9 is an exemplary diagram showing a roaming scheme of voice over LTE (VoLTE).

As can be seen with reference to FIG. 9, the roaming scheme of VoLTE includes a home routed (HR) scheme and a local breakout (LBO) scheme.

According to the LBO scheme, IMS signaling transmitted from a UE is delivered to an S-CSCF in a home PLMN (H-PLMN) via an S-GW/P-GW/P-CSCF in a visited public land mobile network (V-PLMN).

In the HR scheme, the IMS signaling is delivered to the S-CSCF after passing through a P-GW/P-CSCF in the H-PLMH via the S-GW in the V-PLMN.

FIG. 10 is an exemplary signal flow diagram showing an IMS registration procedure of a UE roaming in a visited network through an HR scheme.

Hereinafter, when the IMS registration procedure based on the HR scheme of the UE 10 roaming in the visited network through the HR scheme is described, the duplicated description of FIG. 8 will be omitted.

Referring to FIG. 10, the UE 10 roaming in a visited network (or V-PLMN) transmits a register message to the S-GW 52b of the visited network via an eNB. The S-GW 52b of the visited network transmits the received register message to the P-GW 53a of a home network, and the P-GW 53a transmits the received register message to the P-CSCF 61a (S301). That is, the UE 10 transmits the register message to not a control plane but a user plane.

The P-CSCF 61a subscribes a network identifier (or PLMN-ID) change notification to the PCRF 58a (S303). In this case, the PLMN-ID change notification may be subscribed through an Rx interface. The Rx interface is an interface for exchanging information between the P-CSCF 61a of an IMS network and the PCRF 58a of an EPC network.

The PCRF 58a configures the P-GW 53a to report the PLMN-ID change (S305). In addition, the P-GW 53a reports a PLMN-ID for the network (i.e., the V-PLMN) serving the UE 10 to the PCRF 58a on the basis of information obtained in the PDN setup procedure (S307). As the PLMN-ID change notification is subscribed for the first time, the PCRF 58a reports the PLMN-ID for the V-PLMN to the P-CSCF 61a (S309).

That is, entities of the home network acquire an identifier of the visited network (or VPLMN-ID) in an IMS registration procedure. The VPLMN-ID acquired in this manner may be used in charging, roaming registration restriction, or bear creation for an additional service, or the like.

The P-CSCF 61a adds the PLMN-ID to a P-visited-network-ID header of the register message, and transfer to the I-CSCF 64a the register message to which the PLMN-ID is added (S 311).

In addition, a subsequent IMS registration procedure is performed in the same manner as described with reference to FIG. 8.

Meanwhile, when the network serving the UE 10 is changed due to a movement of the UE 10, the P-GW 53a of the home network may identify a change of the PLMN-ID. Upon identifying the change of the PLMN-ID, the P-GW 53a reports to the PCRF 58a an event occurrence based on the PLMN-ID change. Upon receiving the report of the event occurrence based on the PLMN-ID change, the PCRF 58a reports a new PLMN-ID to the P-CSCF 61a.

However, in order for IMS entities of a home network to acquire a PLMN-ID of a visited network in a state where the UE is roaming based on the HR scheme, as described above, it takes a long time to create an Rx interface by receiving a register message from the UE, to register a PLMN-ID change notification to the PCRF, and to receive a report for the PLMN-ID.

Therefore, there is a need for a solution which allows the IMS entities to more effectively acquire the PLMN-ID of the visited network in the state where the UE is roaming based on the HR scheme.

SUMMARY OF THE INVENTION

Accordingly, a disclosure of the present specification aims to provide a method which allows IP multimedia subsystem (IMS) entities of a home network to effectively acquire a public land mobile network (PLMN)-identifier (ID) of a visited network in a state where a user equipment (UE) is roaming based on a home routed (HR) scheme.

To achieve the above purpose, a disclosure of the present specification provides a method of acquiring an identifier of a visited public land mobile network (V-PLMN), in which a user equipment is roaming. The method may be performed by a proxy-call session control function (P-CSCF) of a home public land mobile network (H-PLMN) and may include: receiving a register message from the user equipment; generating a first V-PLMN identifier on the basis of the register message; and transferring the first V-PLMN identifier to a home subscriber server (HSS), wherein whether the first V-PLMN identifier generated by the P-CSCF corresponds to an identifier for the V-PLMN which is serving the user equipment is verified by the HSS through comparison with a second V-PLMN identifier acquired in an initial attach procedure for an evolved packet core (EPC) of the user equipment.

The generating of the identifier of the first V-PLMN may include: extracting mobile country codes (MCC) and mobile network codes (MNC) from a P-Access-Network-info header of the register message; and generating the first V-PLMN identifier by combining the MCC and the MNC.

The transferring of the first V-PLMN identifier may include: adding the first V-PLMN identifier to a P-Visited-Network-ID header of the register message; and transmitting the register message, to which the first V-PLMN identifier is added, to the HSS through an interrogating-CSCF (I-CSCF).

In the generating of the first V-PLMN identifier, the first V-PLMN identifier may be generated only when the user equipment is roaming to the V-PLMN through a home routed (HR) scheme by using an S8 reference point for transmitting/receiving a signal between a serving-gateway (S-GW) of the V-PLMN and a PDN-gateway (P-GW) of the H-PLMN.

The method may further include performing a registration procedure for an IP multimedia subsystem (IMS) of the user equipment by using the first V-PLMN identifier upon receiving from the HSS an identifier which informs that the first V-PLMN identifier is verified.

To achieve the above purpose, another disclosure of the present specification provides a method of acquiring an identifier of a V-PLMN, in which a user equipment is roaming. The method may be performed by an HSS of an H-PLMN and include: receiving an update location request message from an MME in an initial attach procedure of the user equipment; extracting a second V-PLMN identifier from the update location request message; receiving a first V-PLMN identifier generated by a P-CSCF; and verifying whether the first V-PLMN identifier corresponds to an identifier for the V-PLMN which is serving the user equipment, by comparing the first V-PLMN identifier and the second V-PLMN identifier, wherein the first V-PLMN identifier is a value acquired in a registration procedure for an IMS of the user equipment.

The method may further include, if the first V-PLMN identifier is different from the second V-PLMN identifier, transmitting a message for rejecting registration for the IMS of the user equipment to the P-CSCF.

The method may further include, if the first V-PLMN identifier is identical to the second V-PLMN identifier, transmitting, by the HSS, a user authorization answer message and an indicator for informing that the first V-PLMN identifier is verified to an I-CSCF.

In the verifying of the first v-PLMN identifier, the first V-PLMN identifier may be verified only when the user equipment is roaming to the V-PLMN through an HR scheme by using an S8 reference point for transmitting/receiving a signal between an S-GW of the V-PLMN and a P-GW of the H-PLMN. In addition, in the verifying of the first V-PLMN identifier, whether the user equipment is roaming may be determined through the HR scheme by using the S8 reference point on the basis of subscriber information for the user equipment and a roaming agreement between the H-PLMN and the V-PLMN.

To achieve the aforementioned purpose, another disclosure of the present specification provides a P-CSCF in an H-PLMN for acquiring an identifier of a V-PLMN in which a user equipment is roaming. The P-CSCF includes: a transceiver; and a processor controlling the transceiver. The processor may be configured to: receive a register message from the user equipment by controlling the transceiver; generate a first V-PLMN identifier on the basis of the register message; and transfer the first V-PLMN identifier to an HSS, wherein whether the first V-PLMN identifier corresponds to an identifier for the V-PLMN which is serving the user equipment is verified by the HSS through comparison with a second V-PLMN identifier acquired in an initial attach procedure for an EPC of the user equipment.

To achieve the aforementioned purpose, another disclosure of the present specification provides an HSS in an H-PLMN for verifying an identifier of a V-PLMN in which a user equipment is roaming. The HSS includes: a transceiver; and a processor controlling the transceiver. The processor may be configured to: receive an update location request message from an MME in an initial attach procedure of the user equipment by controlling the transceiver; extract a second V-PLMN identifier from the update location request message; receive a first V-PLMN identifier generated by a P-CSCF; and verify whether the first V-PLMN identifier corresponds to an identifier for the V-PLMN which is serving the user equipment, by comparing the first V-PLMN identifier and the second V-PLMN identifier, wherein the first V-PLMN identifier is a value acquired in a registration procedure for an IMS of the user equipment.

According to a disclosure of the present specification, IP multimedia subsystem (IMS) entities of a home network can effectively acquire a public land mobile network (PLMN)-identifier (ID) of a visited network in a state where a user equipment (UE) is roaming based on a home routed (HR) scheme.

DESCRIPTION OF EXEMPLARY EMBODIMENTS

Figure 1:
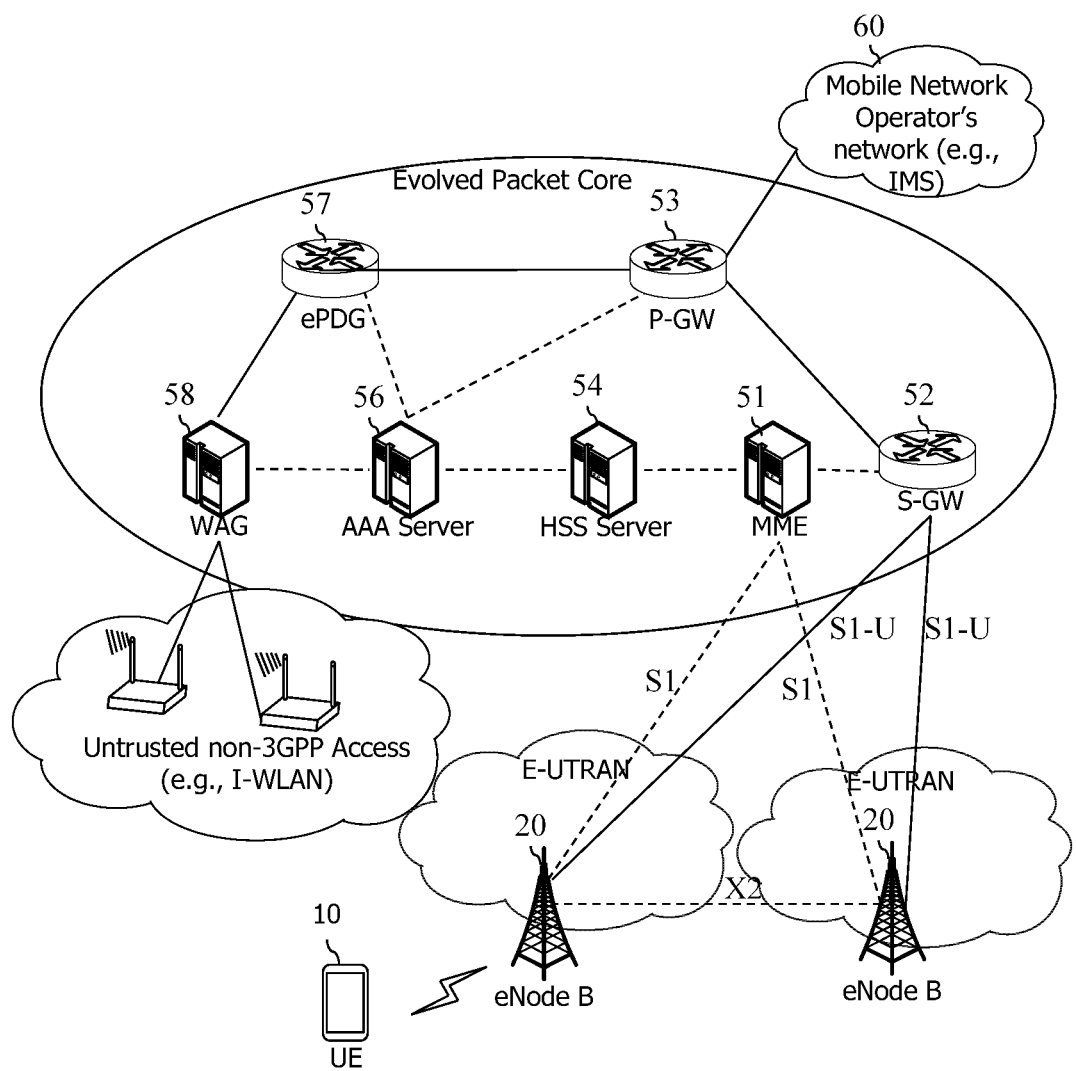
FIG. 1 shows the configuration of an evolved mobile communication network.
Figure 2:
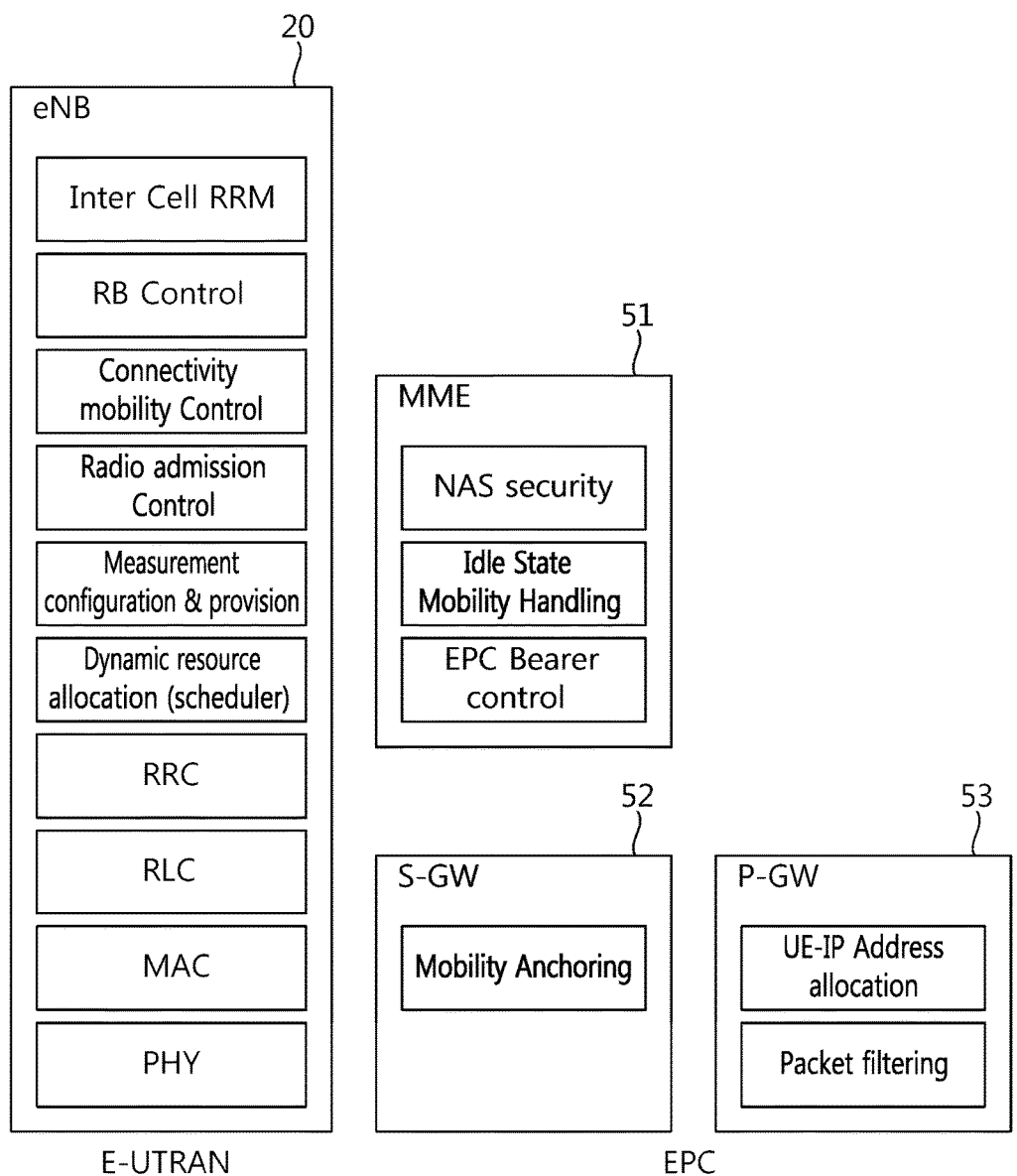
FIG. 2 is an exemplary diagram showing the architecture of a common E-UTRAN and a common EPC.
Figure 3:
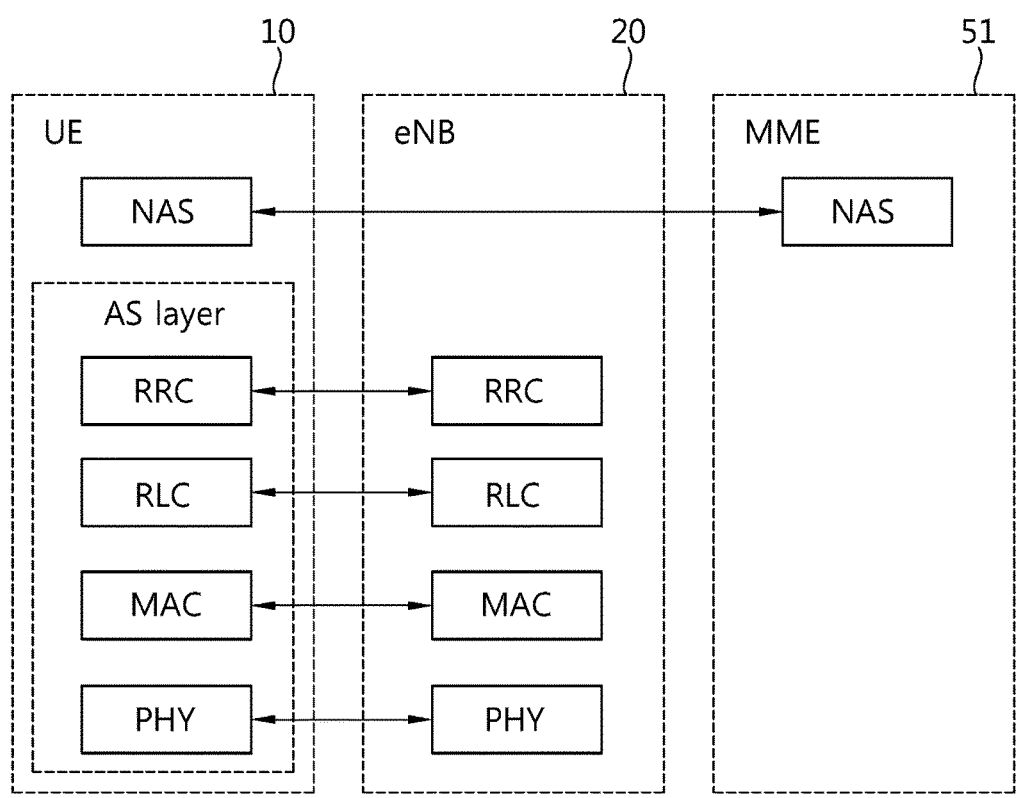
FIG. 3 is an exemplary diagram showing the structure of a radio interface protocol in a control plane between UE and an eNodeB
Figure 4:
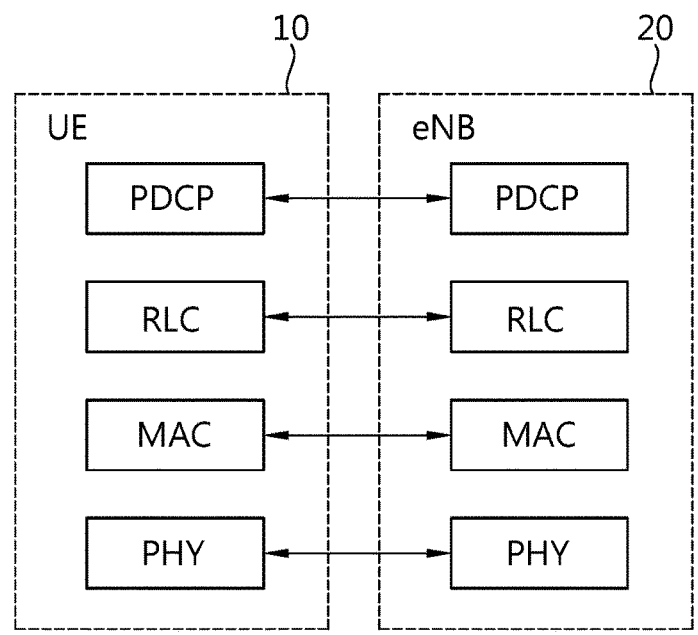
FIG. 4 is another exemplary diagram showing the structure of a radio interface protocol in a control plane between UE and an eNodeB.
Figure 5:
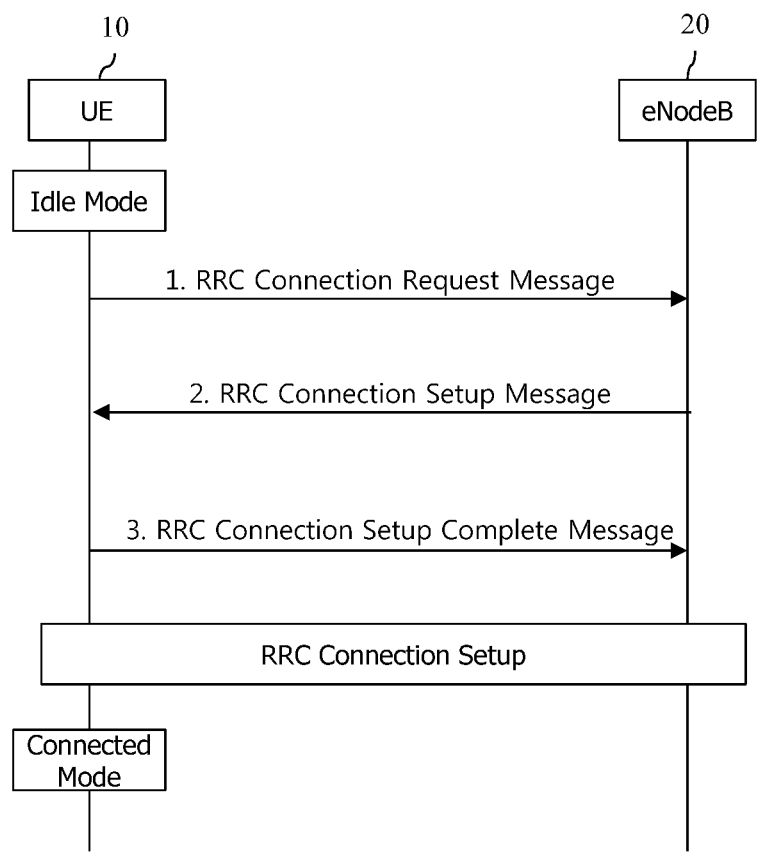
FIG. 5 illustrates a connection process in a radio resource control (RRC) layer.
Figure 6:
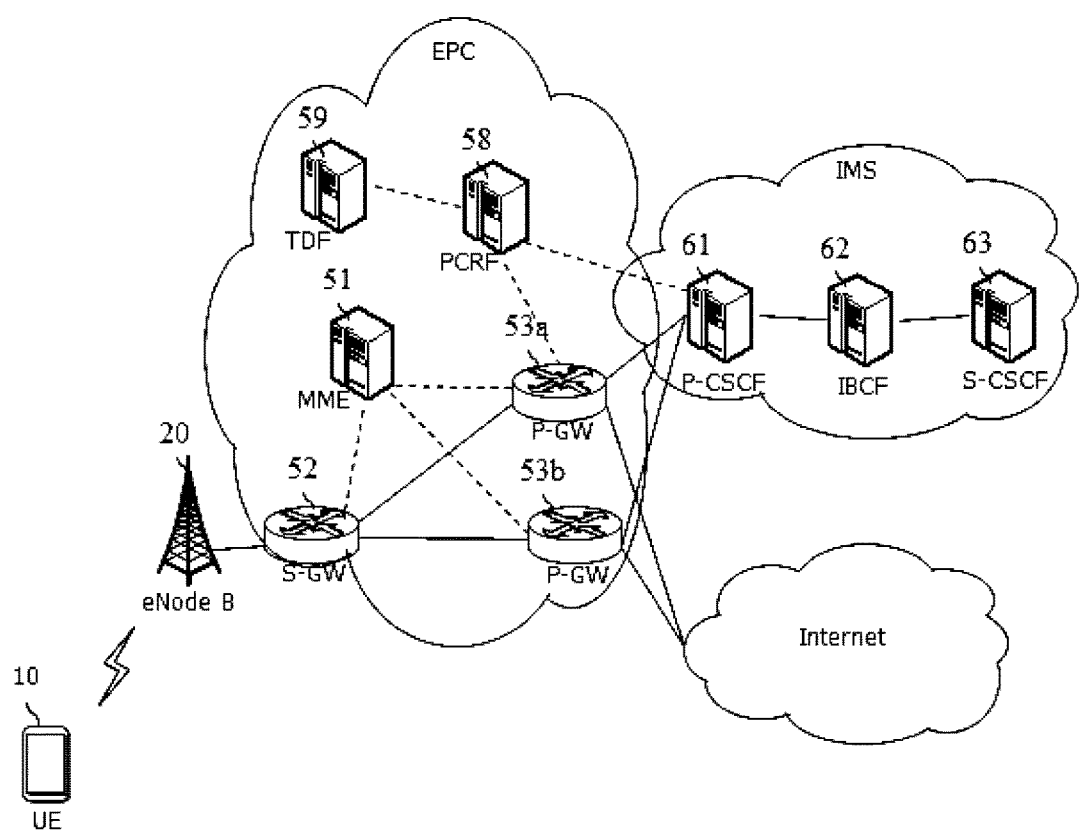
FIG. 6 shows a connection between an EPC and an IP multimedia subsystem (IMS).
Figure 7:
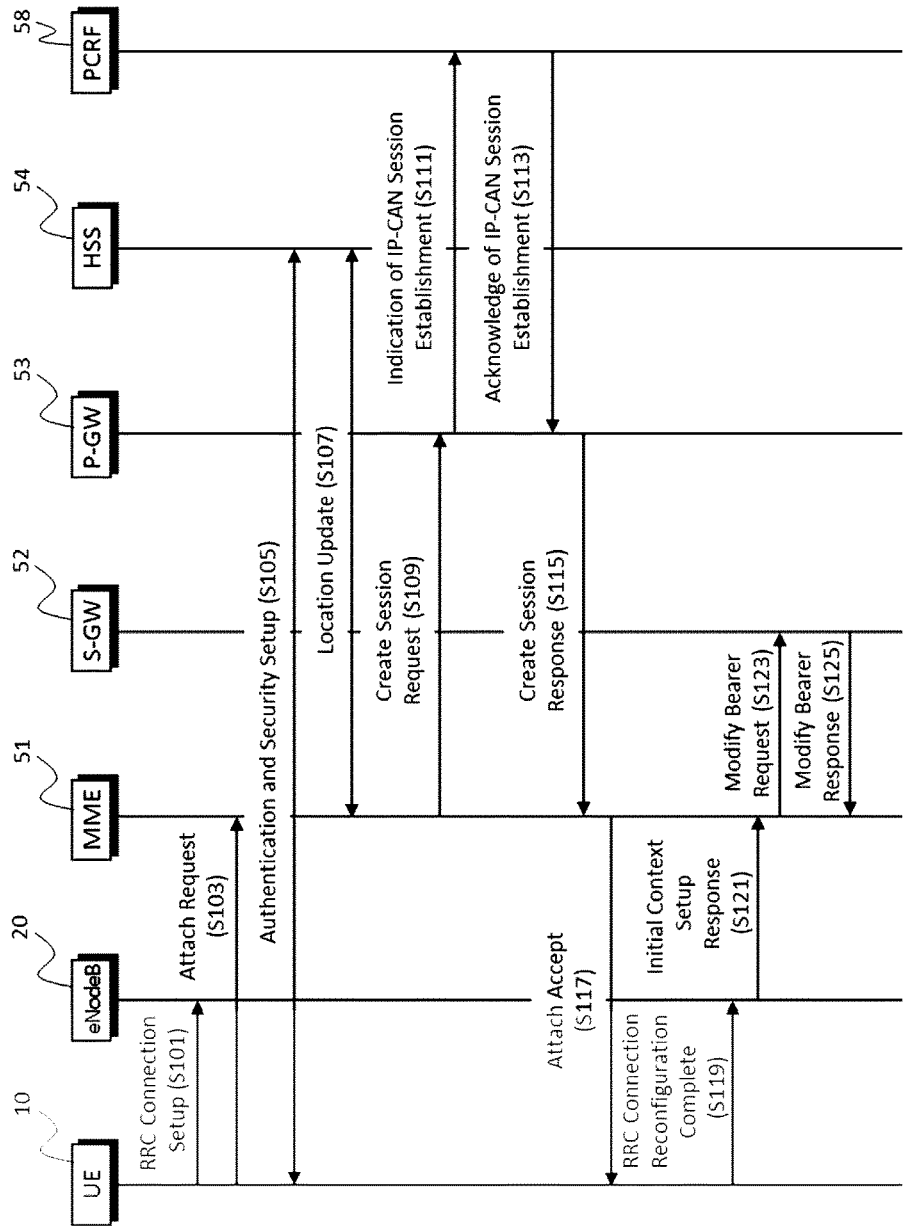
FIG. 7 is an exemplary signal flow diagram showing an initial access procedure of a UE.
Figure 8:
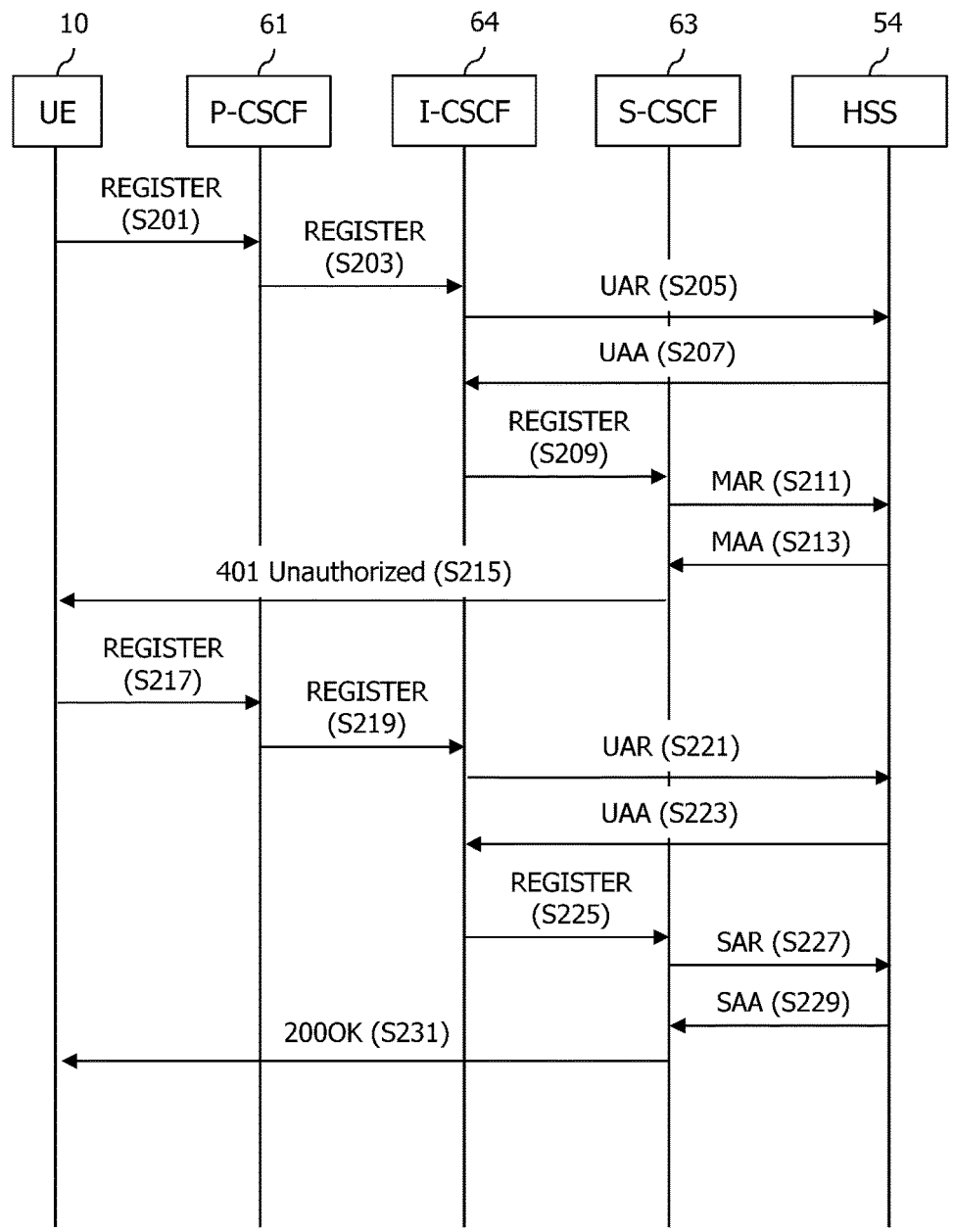
FIG. 8 is an exemplary signal flow diagram showing an IMS initial registration procedure.
Figure 9:
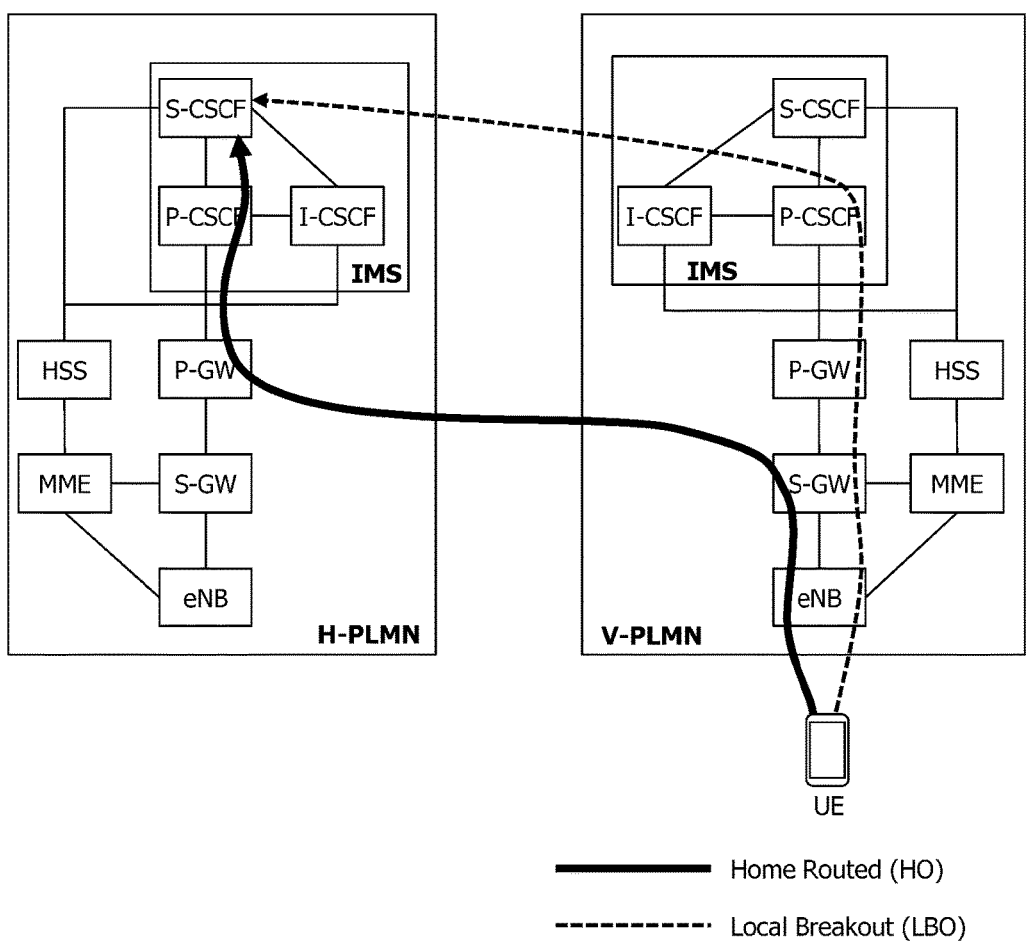
FIG. 9 is an exemplary diagram showing a roaming scheme of voice over LTE (VoLTE).
Figure 10:
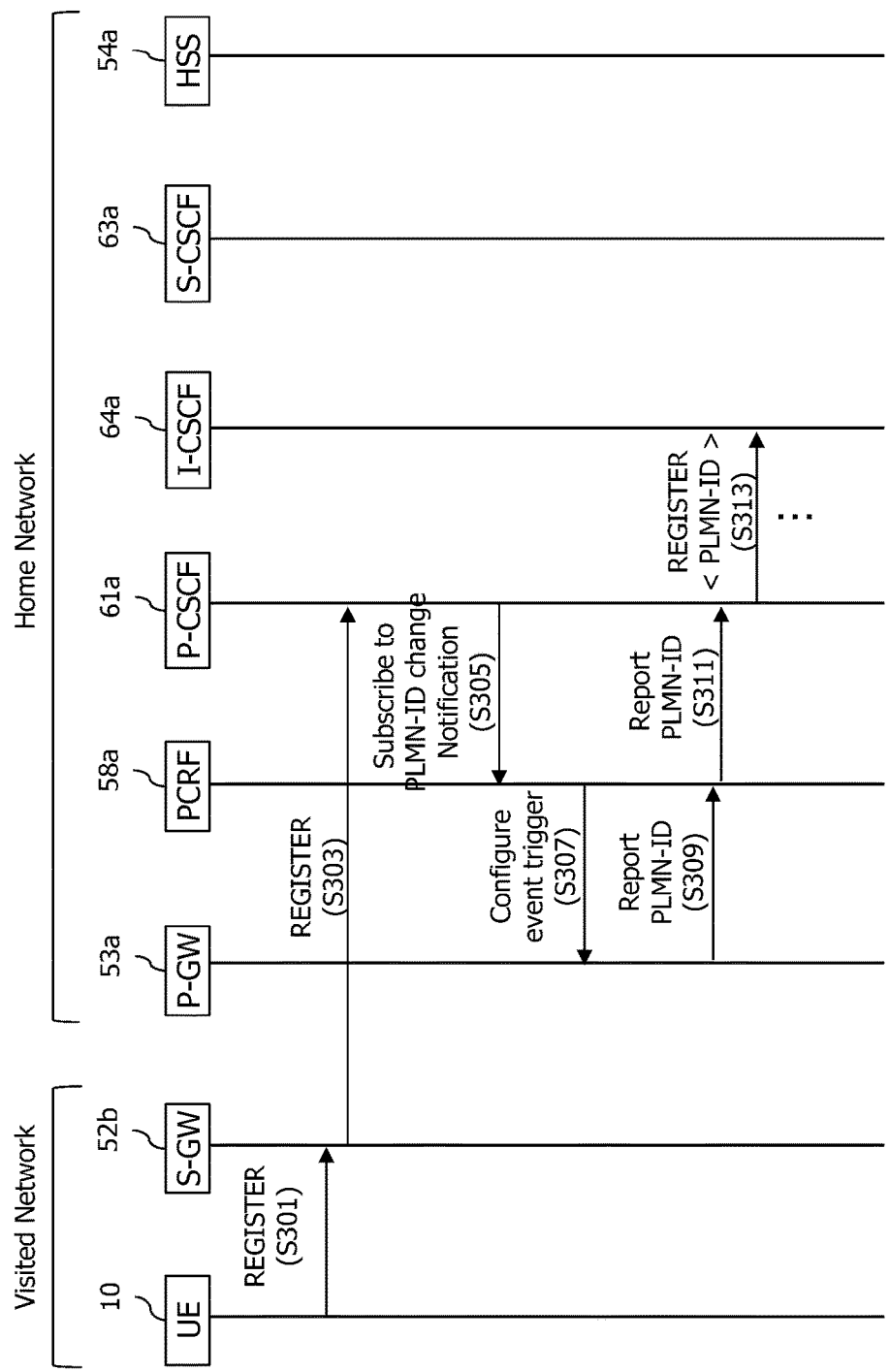
FIG. 10 is an exemplary signal flow diagram showing an IMS registration procedure of a UE roaming in a visited network through an HR scheme.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

A GERAN is an abbreviation of a GSM EDGE Radio Access Network, and it refers to a radio access section that connects a core network and UE by GSM/EDGE.

A UTRAN is an abbreviation of a Universal Terrestrial Radio Access Network, and it refers to a radio access section that connects the core network of the 3rd generation mobile communication and UE.

An E-UTRAN is an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF) is a node of an EPS network which performs different QoS for each service flow and a policy decision for dynamically applying a charging policy.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A Tunnel Endpoint Identifier (TEID) is an end point ID of a tunnel set up between nodes within a network and is set in each section as a bearer unit of each terminal.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

A Non-Access-Stratum (NAS) is a higher stratum of a control plane between UE and an MME. The NAS supports mobility management and session management between UE and a network, IP address maintenance, and so on.

RAT is an abbreviation of Radio Access Technology, and it means a GERAN, a UTRAN, or an E-UTRAN.

Meanwhile, an embodiment proposed hereinafter may be implemented alone, or may be implemented by combining several embodiments.

<Disclosure of the Present Specification>

The present specification proposes a method which allows IMS entities of a home network to effectively acquire a PLMN-ID of a visited network in a state where a UE is roaming based on an HR scheme. In particular, the present specification proposes a method in which the IMS entities of the home network can acquire the PLMN-ID of the visited network from the UE in an IMS registration procedure. Further, the present specification also proposes a method of performing comparison and verification on the basis of the PLMN-ID acquired at an EPC level to ensure reliability of the PLMN-ID of the visited network, acquired from the UE.

1. Acquiring of PLMN-ID at EPC Level

In the aforementioned initial attach procedure, upon receiving an attach request message from the UE 10, the MME 51 transmits an update location request (ULR) message to the HSS 54 in order to perform a location registration procedure of the UE 10. In this case, an international mobile station identify (IMSI), an MME ID, and a visited-PLMN-ID may be included in the ULR message. Herein, the visited-PLMN-ID indicates a PLMN-ID of a visited network which is serving the UE 10.

The HSS 54 extracts the PLMN-ID of the visited network from the received ULR message and stores it.

As a result, the HSS 53 may acquire the PLMN-ID of the visited network which is serving the UE 10 in the initial attach procedure.

2. Acquiring of PLMN-ID at IMS Level

In the aforementioned IMS registration procedure, the P-CSCF 61 receives a register message from the UE 10. In this case, mobile country codes (MCC) and mobile network codes (MNC) are included in a P-Access-Network-info header of the register message.

Figure 11:
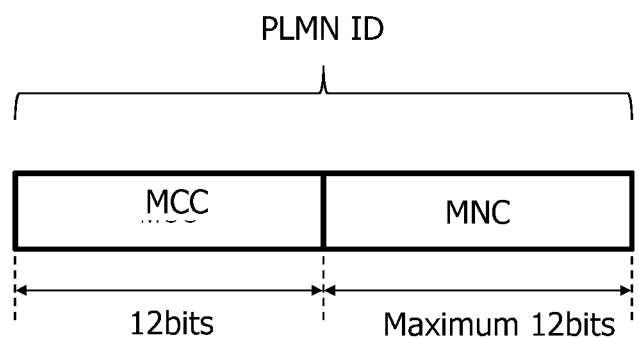
FIG. 11 is an exemplary view showing the concept of a PLMN-ID structure.

FIG. 11 is an exemplary view showing the concept of a PLMN-ID structure.

As shown in FIG. 11, a PLMN-ID consists of MCC and MNC.

Therefore, the P-CSCF 61 may generate a PLMN-ID of a visited network which is serving the UE 10, by using the MCC and MNC included in the P-Access-Network-info header of the received register message.

The P-CSCF 61 adds the generated PLMN-ID to the P-Visited-Network-ID header of the register message, and temporarily store the generated PLMN-ID. In addition, the P-CSCF 61 transfers to the I-CSCF 64 the register message to which the PLMN-ID is added.

In particular, the P-CSCF 61 may be implemented to determine whether the roaming UE 10 is roaming through an HR scheme using an S8 reference point, and to generate the PLMN-ID only when it is determined that the UE 10 is roaming through the HR scheme.

The I-CSCF 64 transfers to the HSS 54 the PLMN-ID received from the P-CSCF 61 in a process of transmitting a user authorization request (UAR) message. The I-CSCF 64 may transfer the PLMN-ID to the HSS 54 by including it to the UAR message, or may transfer the PLMN-ID to the HSS 54 through an additional message.

As a result, the HSS 54 may acquire the PLMN-ID of the visited network which is serving the UE 10 in the IMS registration procedure.

3. PLMN-ID Verification Scheme

A PLMN-ID acquired at an IMS level is generated based on a register message transmitted from the UE 10, and thus reliability may be low. That is, when the UE 10 transmits the register message by maliciously changing it, the PLMN-ID acquired at the IMS level may be different from the PLMN-ID of the visited network which is actually serving the UE 10. Therefore, the HSS 54 may verify the PLMN-ID acquired at the IMS level in comparison with a PLMN-ID acquired at an EPC level.

Specifically, the HSS 54 determines whether the PLMN-ID acquired at the IMS level is identical to the PLMN-ID acquired at the EPC level. In particular, the HSS 54 may be implemented to determine whether the roaming UE 10 is roaming through an HR scheme using an S8 reference point, and to determine whether the PLMN-ID acquired at the IMS level is identical to the PLMN-ID acquired at the EPC level only when it is determined that the UE 10 is roaming through the HR scheme. The HSS 54 may determine whether the UE 10 is roaming through the HR scheme on the basis of a roaming agreement or subscriber information of the UE 10.

If the PLMN-ID acquired at the IMS level is not identical to the PLMN-ID acquired at the EPC level, the HSS 54 may determine that the PLMN-ID acquired at the IMS level is unreliable, and may transmit to the P-CSCF 61 a reject message for preventing IMS registration of the UE 10. In addition, the P-CSCF 61 transmits an IMS registration failure message to the UE 10.

Otherwise, if the PLMN-ID acquired at the IMS level is identical to the PLMN-ID acquired at the EPC level, the HSS 54 and IMS entities perform the IMS registration procedure by using the PLMN-ID acquired at the IMS level.

Specifically, in the same manner as the existing IMS registration procedure, the HSS 54 may transmit a UAA message to the I-CSCF 64 in response to the UAR message. In addition, the P-CSCF 61, the I-CSCF 64, and the S-CSCF 63 may perform the IMS registration procedure by using the PLMN-ID acquired at the IMS level. That is, when the UAA message is transmitted from the HSS 54 instead of the reject message, the IMS entities may determine that the PLMN-ID acquired at the IMS level is verified implicitly or indirectly, and may perform the IMS registration procedure by using the PLMN-ID acquired at the IMS level.

Unlike this, the HSS 54 may transmit to the I-CSCF 64 or the P-CSCF 61 an indicator for informing that the PLMN-ID acquired at the IMS level is verified in addition to the UAR. In addition, only when the indicator is received from the HSS 54, the P-CSCF 61, the I-CSCF 64, and the S-CSCF 63 may perform the IMS registration procedure by using the PLMN-ID acquired at the IMS level. That is, when the indicator is transmitted directly from the HSS 54, the IMS entities may determine that the PLMN-ID acquired at the IMS level is verified, and may perform the IMS registration procedure by using the PLMN-ID acquired at the IMS level.

Therefore, according to the present specification, the IMS entities may perform the IMS registration procedure and subsequent procedures by using the PLMN-ID acquired at the IMS level, without having to perform a process of registering a notification for a PLMN-ID change for the EPS entity and receiving the PLMN-ID reported from the EPS entity.

For example, the P-CSCF 61 may perform non UE detectable emergency call or charging processing by using the PLMN-ID acquired at the IMS level. In addition, a telephony application server (TAS) may acquire the PLMN-ID acquired at the IMS level from the HSS 54 through an Sh interface.

Figure 12:
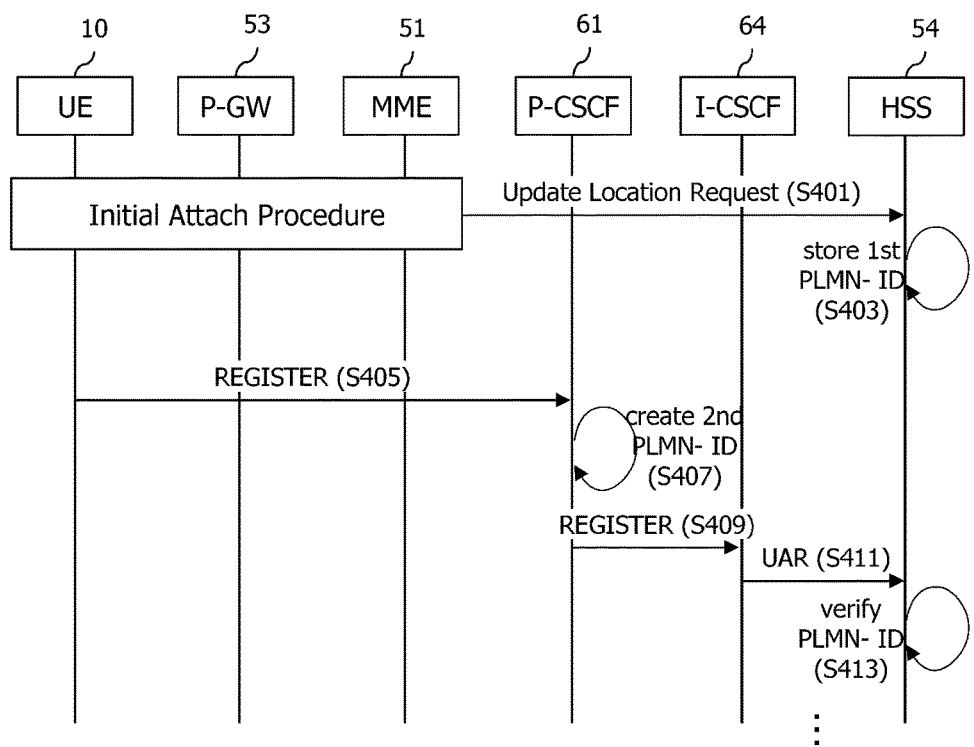
FIG. 12 is a signal flow diagram for explaining a method of acquiring a PLMN-ID according to the present specification.

FIG. 12 is a signal flow diagram for explaining a method of acquiring a PLMN-ID according to the present specification.

Referring to FIG. 12, the HSS 54 receives a ULR message received in an initial attach procedure of the UE 10 (S401). The HSS 54 extracts a PLMN-ID of a visited network from the ULR message and stores it (S403).

Upon receiving a register message from the UE 10 (S405), the P-CSCF 61 generates the PLMN-ID on the basis of MCC and MNC included in a P-Access-Network-info header of the register message (S407). The P-CSCF 61 transmits the generated PLMN-ID by adding it to a P-Visited-Network-ID header of the register message, and temporarily stores the generated PLMN-ID (S409).

The I-CSCF 64 transfers to the HSS 54 the PLMN-ID received from the P-CSCF 61 in a process of transmitting a UAR message (S411).

The HSS 54 verifies the PLMN-ID by determining whether the PLMN-ID stored in step S403 is identical to the PLMN-ID generated in step S407 (S413).

If the PLMN-ID stored in step S403 is not identical to the PLMN-ID generated in step S407, the HSS 54 transmits a reject message to the P-CSCF 61, and the P-CSCF 61 transmits an IMS registration failure message to the UE 10. Otherwise, if the PLMN-ID stored in step S403 is identical to the PLMN-ID generated in step S407, the HSS 54, the P-CSCF 61, the I-CSCF 64, and the S-CSCF 63 perform an IMS registration procedure by using the PLMN-ID generated in step S407. Details of the IMS registration procedure are the same as described above, and thus descriptions thereof will be omitted.

Figure 13:
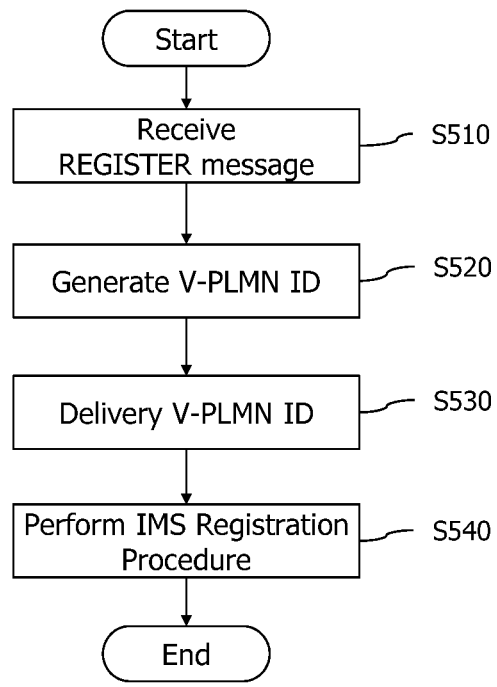
FIG. 13 is a flowchart showing a method of acquiring a PLMN-ID according to a disclosure of the present specification.

FIG. 13 is a flowchart showing a method of acquiring a PLMN-ID according to a disclosure of the present specification.

Referring to FIG. 13, the P-CSCF 61 receives a register message from the UE 10 (S510).

The P-CSCF 61 generates a first V-PLMN identifier on the basis of the register message (S520). Specifically, the P-CSCF 61 may extract MCC and MNC from a P-Access-Network-info header of the register message, and may generate the first V-PLMN identifier by combining the extracted MCC and MNC. In particular, the P-CSCF 61 may generate the first V-PLMN identifier only for a case where the UE 10 is roaming to a V-PLMN through an HR scheme by using an S8 reference point.

The P-CSCF 61 transfers the generated first V-PLMN identifier to the HSS 54 (S530). Specifically, the P-CCF 61 may add the first V-PLMN identifier to a P-Visited-Network-ID header of the register message, and may transmit the register message, to which the first V-PLMN identifier is added, to the HSS 54 through the I-CSCF 64. In this case, whether the first V-PLMN identifier corresponds to an identifier for the V-PLMN which is actually serving the UE 10 is verified through comparison with a second V-PLMN identifier acquired in an initial attach procedure of the UE 10.

Upon receiving from the HSS an indicator which informs that the first V-PLMN identifier is verified, the P-CSCF 61 performs the IMS registration procedure of the UE 10 by using the first V-PLMN identifier (S540).

Figure 14:
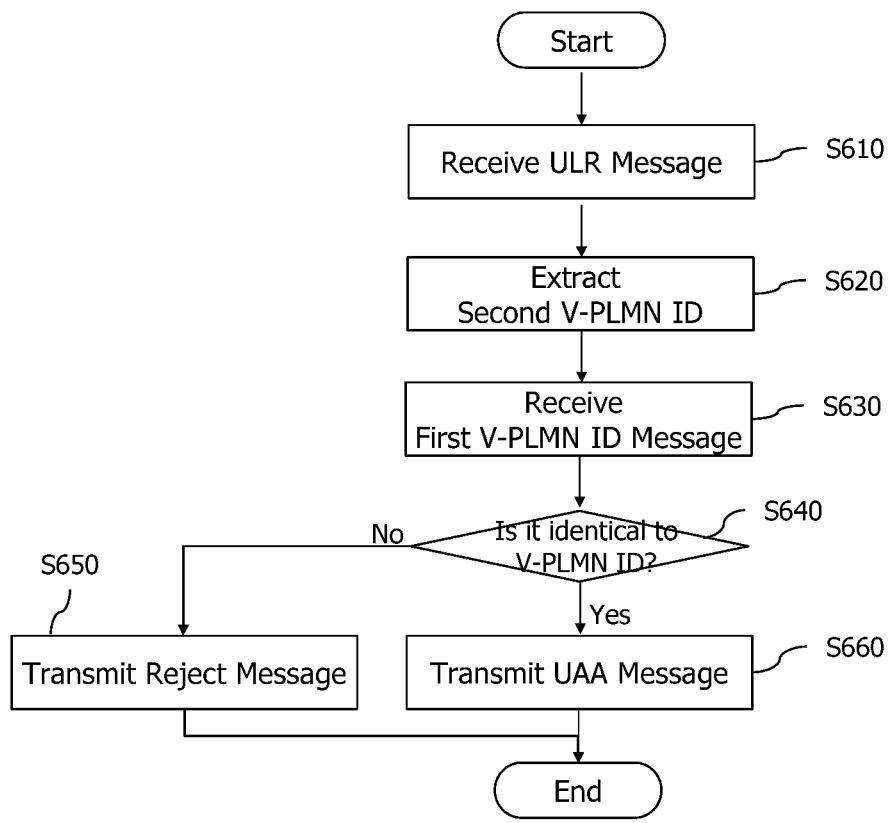
FIG. 14 is a flowchart showing a method of acquiring a PLMN-ID according to another disclosure of the present specification.

FIG. 14 is a flowchart showing a method of acquiring a PLMN-ID according to another disclosure of the present specification.

Referring to FIG. 14, the HSS 54 receives a ULR message from the MME 51 in an initial attach procedure (S610).

The HSS 54 extracts a second V-PLMN identifier from the ULR message (S620).

The HSS 54 receives the first V-PLMN identifier generated by the P-CSCF 61 (S630). Herein, the first V-PLMN identifier is a value acquired in an IMS registration procedure of the UE 10.

The HSS 54 verifies whether the first V-PLMN identifier corresponds to an identifier for the V-PLMN which is actually serving the UE 10 by comparing the first V-PLMN identifier and the second V-PLMN identifier (S640). Specifically, the HSS 54 may verify the first V-PLMN identifier only for a case where the UE 10 is roaming to the V-PLMN through an HR scheme by using an S8 reference point. The HSS 54 may determine whether the UE 10 is roaming through the HR scheme by using the S8 reference point on the basis of subscriber information for the UE 10 and a roaming agreement between the H-PLMN and the V-PLMN.

If the first V-PLMN identifier is different from the second V-PLMN identifier, the HSS 54 transmits to the P-CSCF 61 a reject message for rejecting IMS registration of the UE 10 (S650). In this case, the P-CSCF 61 ends the IMS registration procedure by transmitting an IMS registration failure message to the UE 10.

In addition, if the first V-PLMN identifier is identical to the second V-PLMN identifier, the HSS 54 transmits to the I-CSCF 64 a UAA message together with a direct or indirect indicator for informing that the first V-PLMN identifier is verified (S660). In this case, the indicator for informing that the first V-PLMN identifier is verified may be any one of additional information different from UAA and information included in the UAA. In this case, IMS entities perform the IMS registration procedure by using the first V-PLMN identifier.

The aforementioned embodiments of the present invention can be implemented through various means. For example, the embodiments of the present invention can be implemented in hardware, firmware, software, combination of them, etc.

Figure 15:
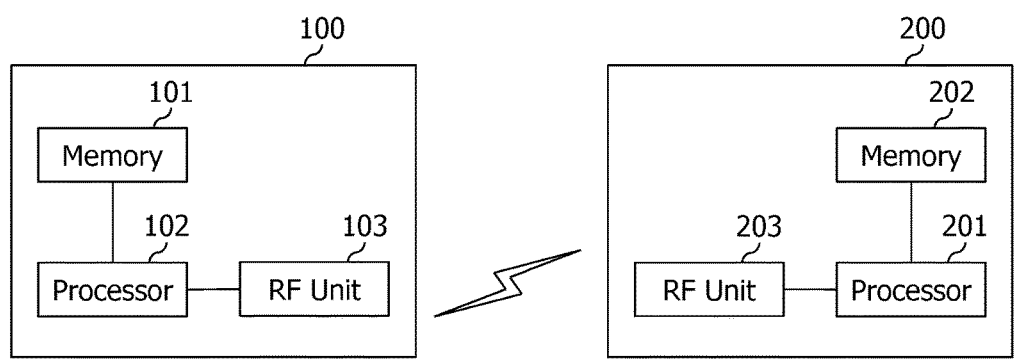
FIG. 15 is a block diagram showing a structure of a UE and a P-CSCF according to a disclosure of the present specification.

FIG. 15 is a block diagram showing a structure of a UE and a P-CSCF according to a disclosure of the present specification.

The UE 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method.

The P-CSCF 200 includes a processor 201, a memory 202, and a radio frequency RF unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

The processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module procedure, function, and the like to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method of acquiring an identifier of a visited public land mobile network (V-PLMN), in which a user equipment is roaming, the method performed by a proxy-call session control function (P-CSCF) of a home public land mobile network (H-PLMN) and comprising:
   receiving, by the P-CSCF, a register message from the user equipment;
   generating, by the P-CSCF, a first V-PLMN identifier on the basis of the register message; and
   transferring, by the P-CSCF, the first V-PLMN identifier to a home subscriber server (HSS),
   wherein whether the first V-PLMN identifier generated by the P-CSCF corresponds to an identifier for the V-PLMN which is serving the user equipment is verified by the HSS through comparison with a second V-PLMN identifier acquired in an initial attach procedure for an evolved packet core (EPC) of the user equipment.

2. The method of claim 1, wherein the generating of the identifier of the first V-PLMN comprises:
  extracting mobile country codes (MCC) and mobile network codes (MNC) from a P-Access-Network-info header of the register message; and
  generating the first V-PLMN identifier by combining the MCC and the MNC.

3. The method of claim 1, wherein the transferring of the first V-PLMN identifier comprises:
  adding the first V-PLMN identifier to a P-Visited-Network-ID header of the register message; and
  transmitting the register message, to which the first V-PLMN identifier is added, to the HSS through an interrogating-CSCF (I-CSCF).

4. The method of claim 1, wherein in the generating of the first V-PLMN identifier, the first V-PLMN identifier is generated only when the user equipment is roaming to the V-PLMN through a home routed (HR) scheme by using an S8 reference point for transmitting/receiving a signal between a serving-gateway (S-GW) of the V-PLMN and a PDN-gateway (P-GW) of the H-PLMN.

5. The method of claim 1, further comprising performing, by the P-CSCF, a registration procedure for an IP multimedia subsystem (IMS) of the user equipment by using the first V-PLMN identifier upon receiving from the HSS an identifier which informs that the first V-PLMN identifier is verified.

6. A proxy-call session control function (P-CSCF) in a home public land mobile network (H-PLMN) for acquiring an identifier of a visited public land mobile network (V-PLMN) in which a user equipment is roaming, the P-CSCF comprising:
  a transceiver; and
  a processor controlling the transceiver, wherein the processor is configured to:
  receive a register message from the user equipment by controlling the transceiver;
  generate a first V-PLMN identifier on the basis of the register message; and
  transfer the first V-PLMN identifier to a home subscriber server (HSS),
  wherein whether the first V-PLMN identifier corresponds to an identifier for the V-PLMN which is serving the user equipment is verified by the HSS through comparison with a second V-PLMN identifier acquired in an initial attach procedure for an evolved packet core (EPC) of the user equipment.

7. The P-CSCF of claim 6, wherein the generating of the first V-PLMN identifier comprises:
  extracting mobile country codes (MCC) and mobile network codes (MNC) from a P-Access-Network-info header of the register message; and
  generating the first V-PLMN identifier by combining the MCC and the MNC.

8. The P-CSCF of claim 6, wherein the transferring of the first V-PLMN identifier comprises:
  adding the first V-PLMN identifier to a P-Visited-Network-ID header of the register message; and
  transmitting the register message, to which the first V-PLMN identifier is added, to the HSS through an interrogating-CSCF (I-CSCF).

* * * * *